Figure 12:
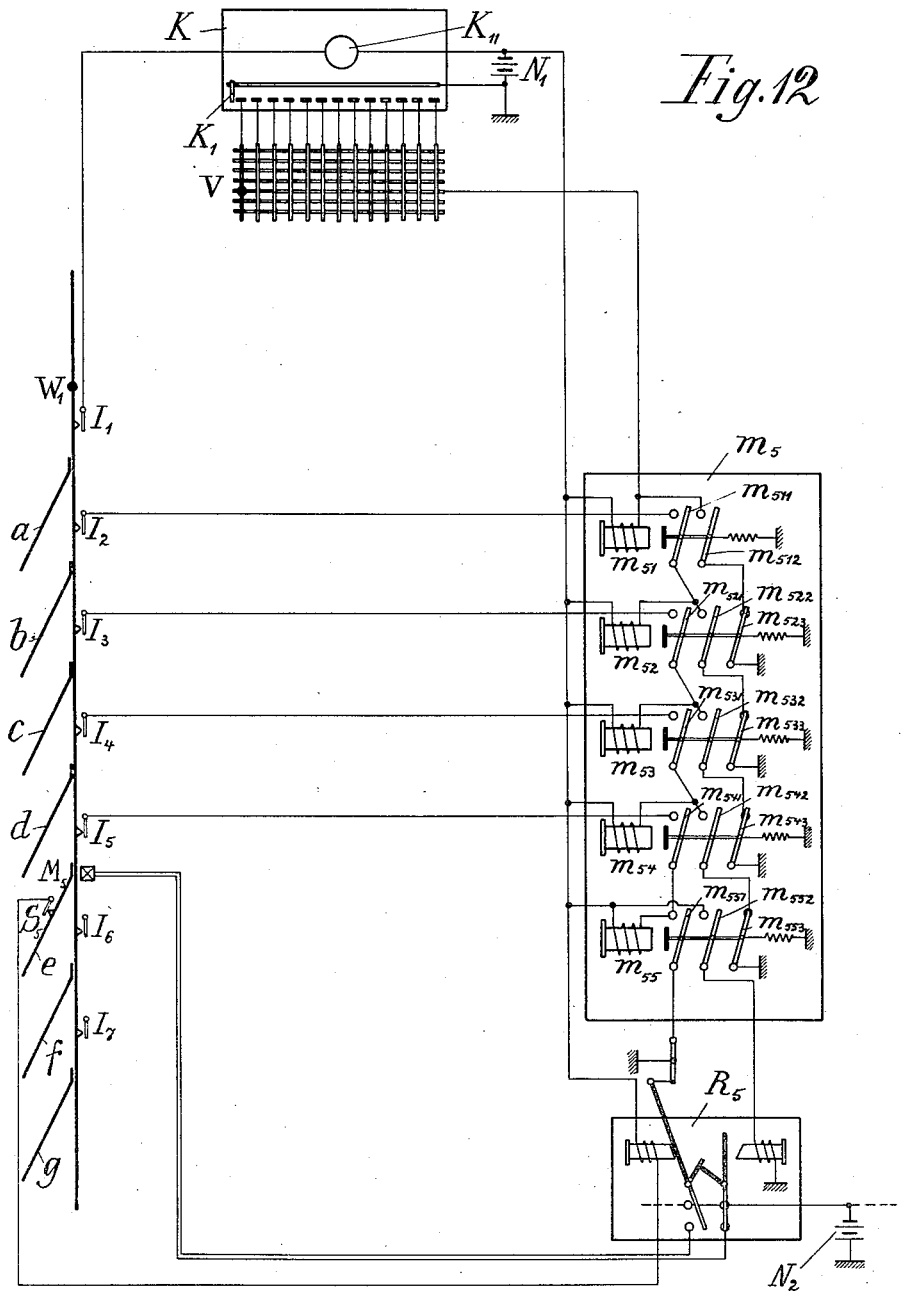

R. PFEIL.
SWITCH YARD FOR GRAVITY SYSTEMS.
APPLICATION FILED SEPT. 28, 1909.
1,067,544.
Patented July 15, 1913.
10 SHEETS—SHEET 1.
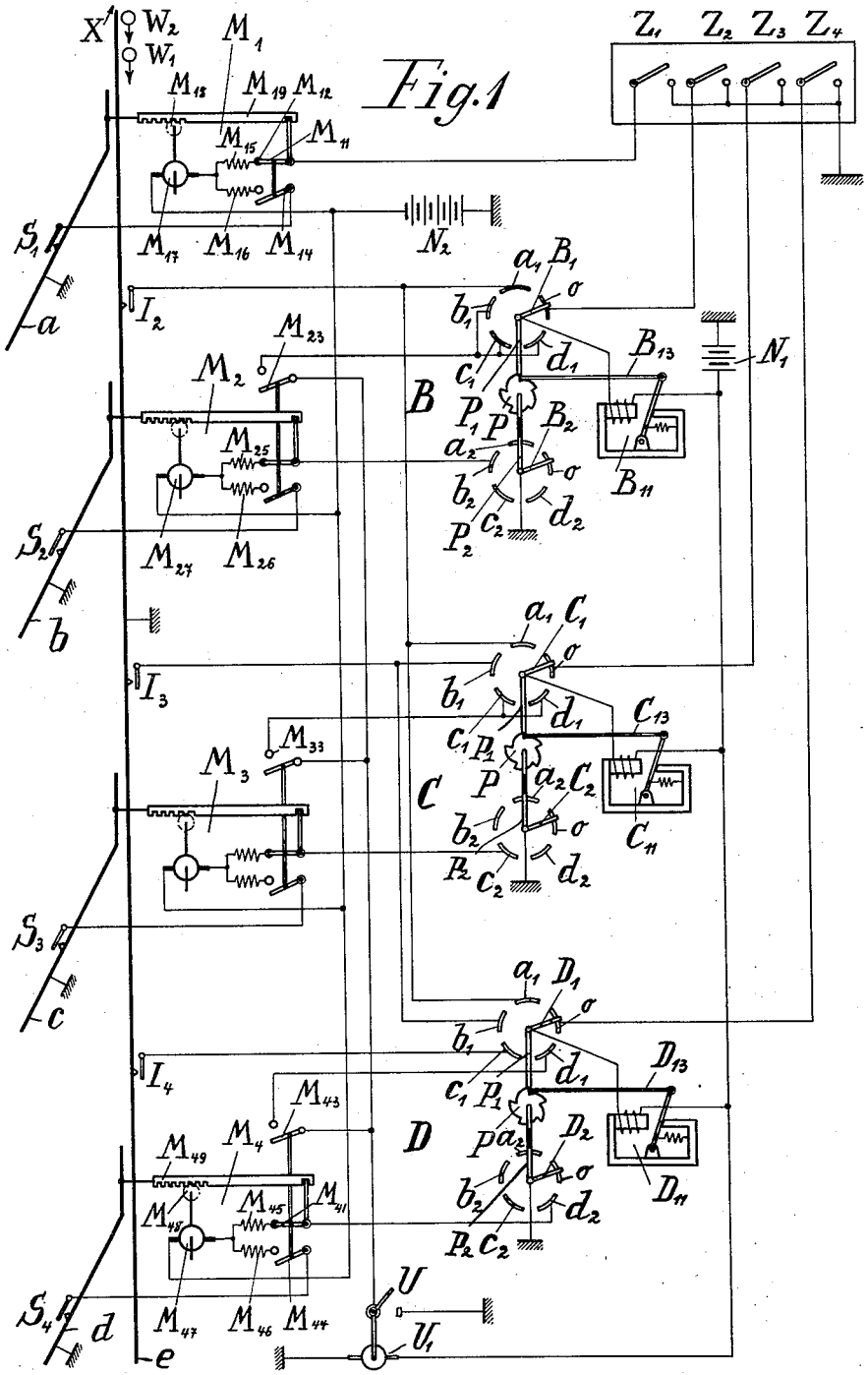

R. PFEIL.
SWITCH YARD FOR GRAVITY SYSTEMS.
APPLICATION FILED SEPT. 28, 1909.
1,067,544.
Patented July 15, 1913.
10 SHEETS—SHEET 2.
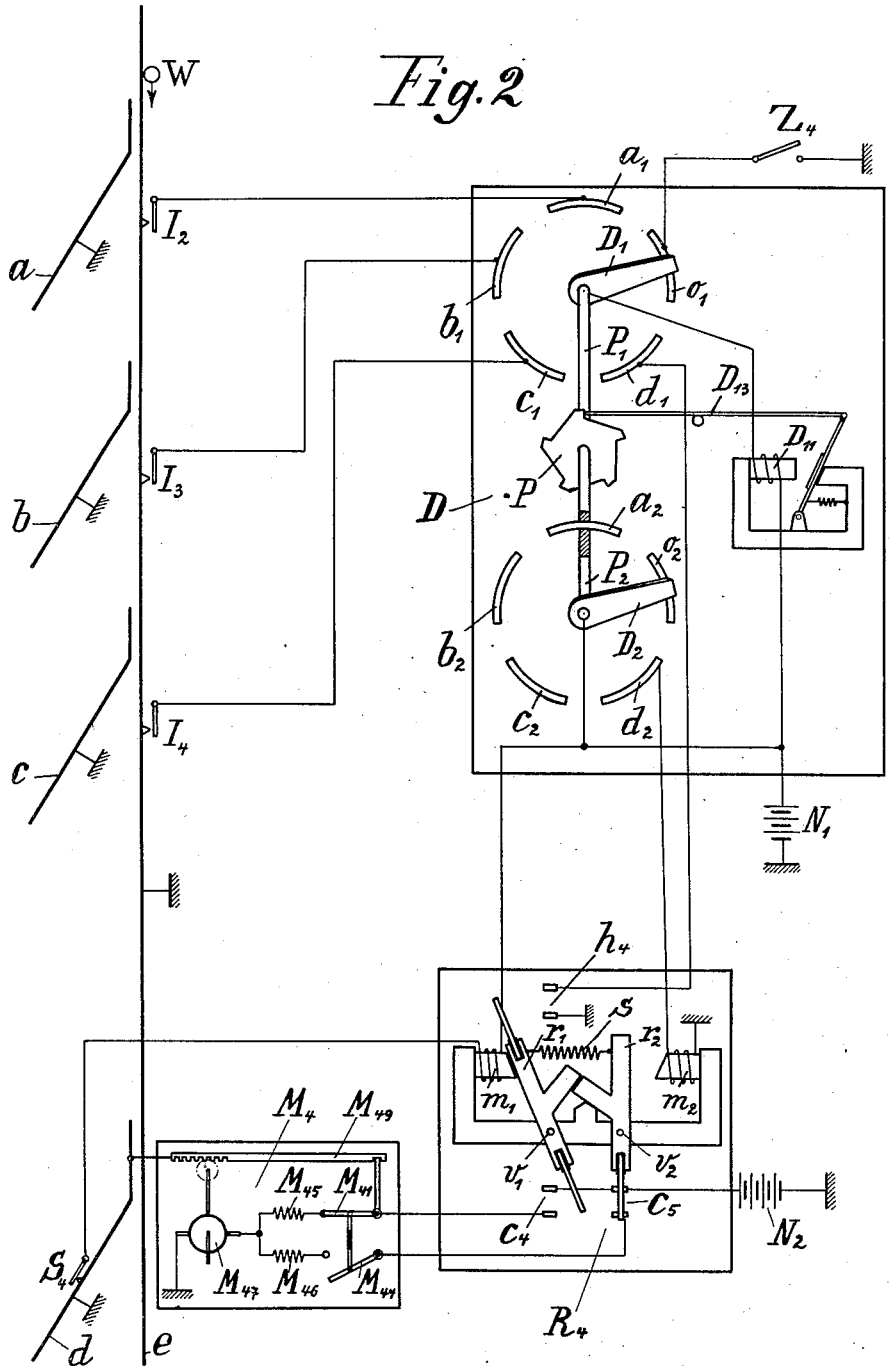
Witnesses
H. H. Knight
J. M. Ryan
Inventor
Robert Pfeil
by
his attorneys

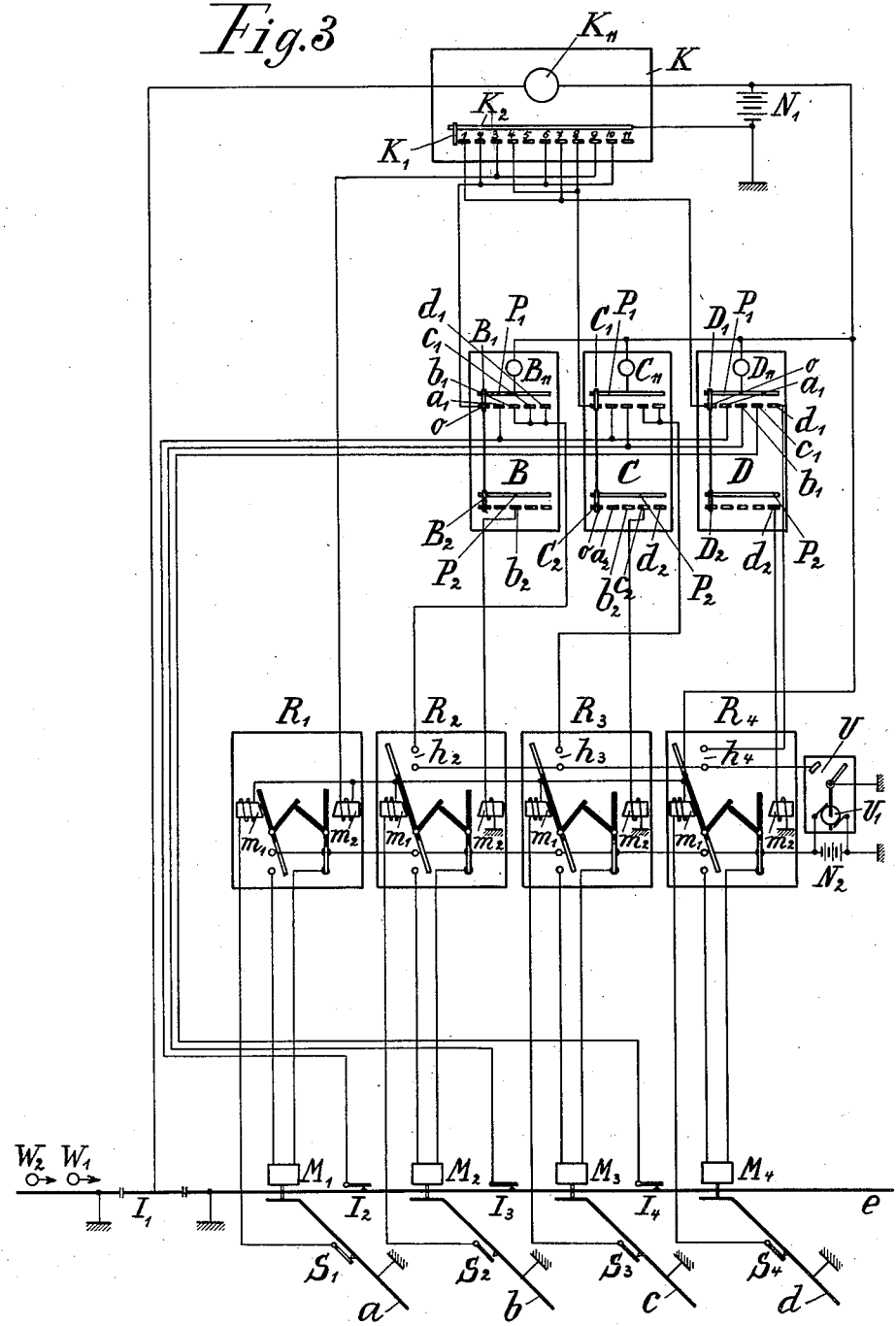

R. PFEIL.
SWITCH YARD FOR GRAVITY SYSTEMS.
APPLICATION FILED SEPT. 28, 1909.
1,067,544.
Patented July 15, 1913.
10 SHEETS—SHEET 4.
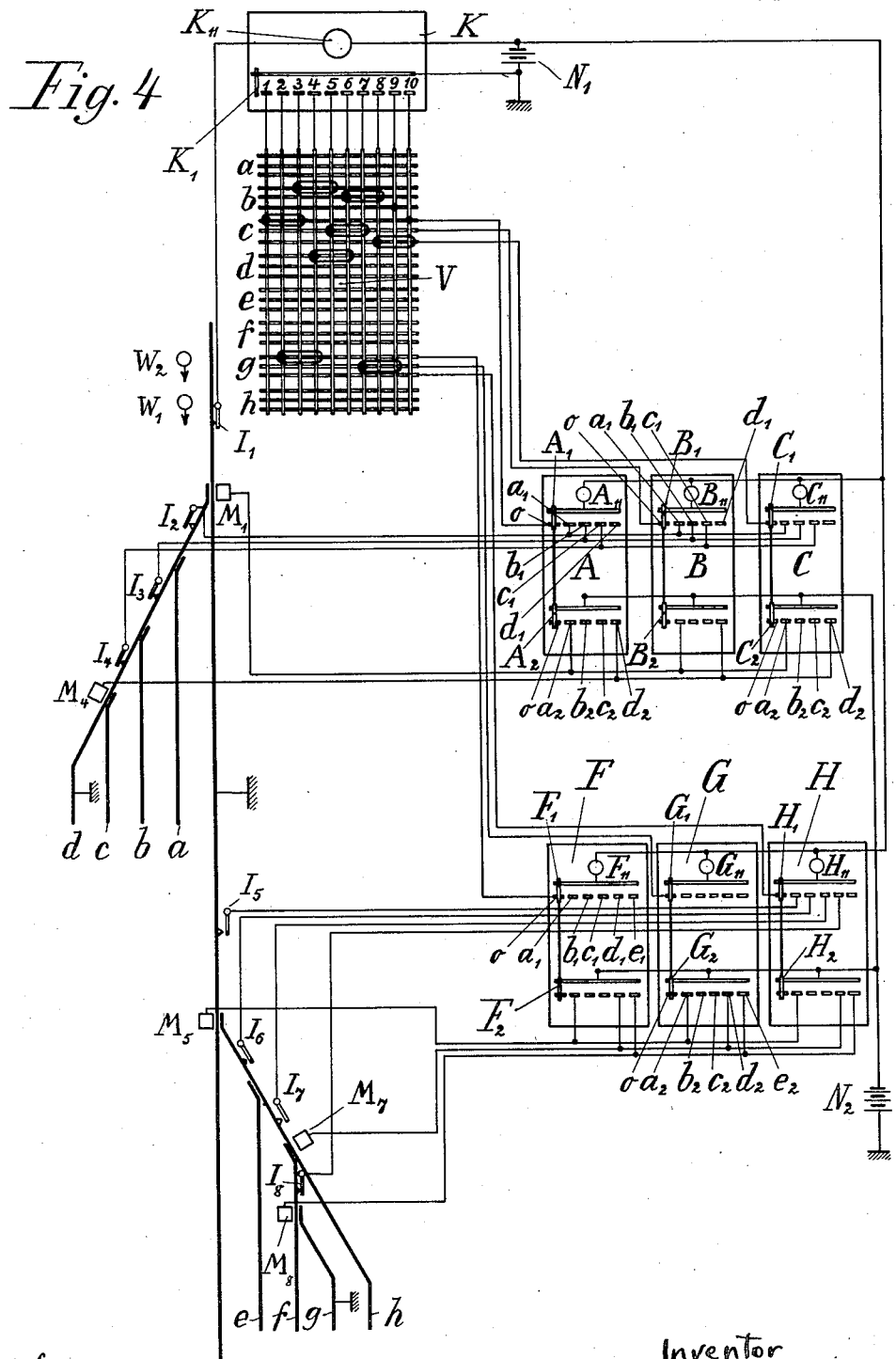

R. PFEIL.
SWITCH YARD FOR GRAVITY SYSTEMS.
APPLICATION FILED SEPT. 28, 1909.
1,067,544.
Patented July 15, 1913.
10 SHEETS—SHEET 5.
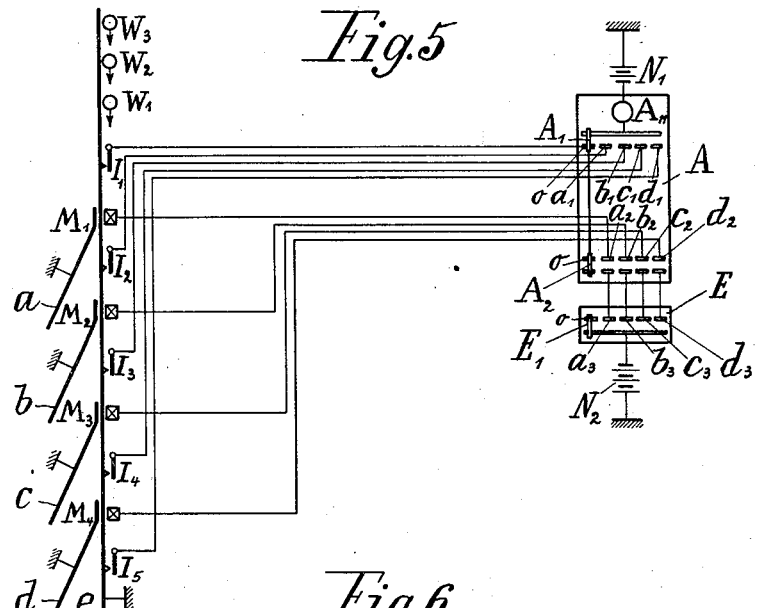
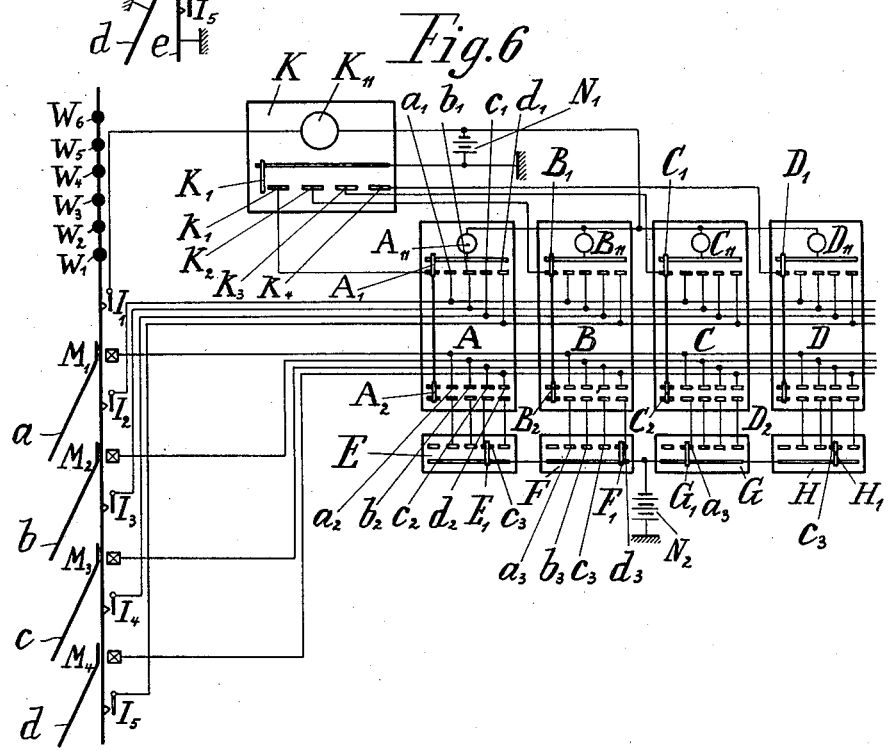
Witnesses
H. H. Knight
J. M. Ryan
Inventor
Robert Pfeil
by
his attorneys

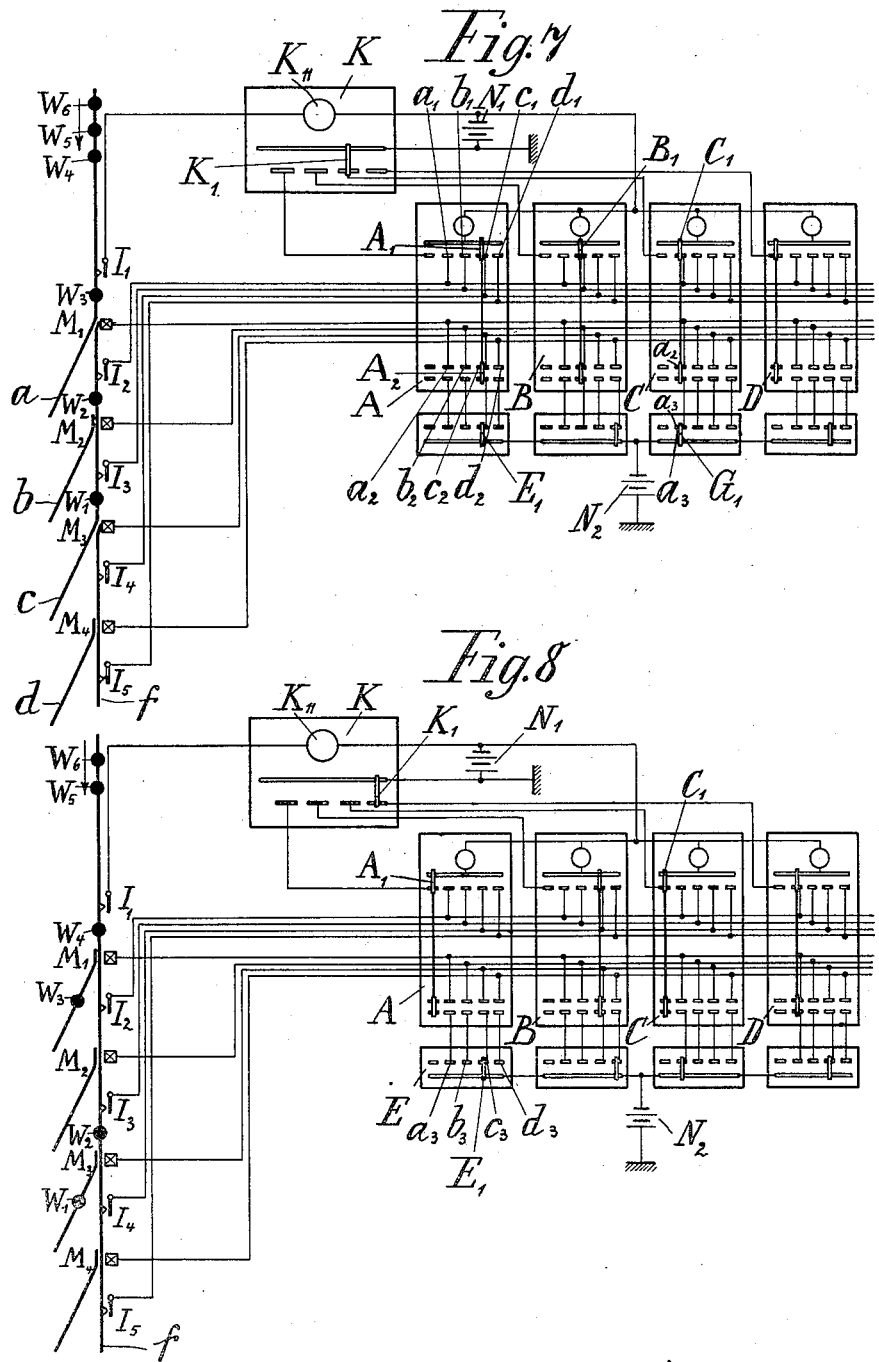

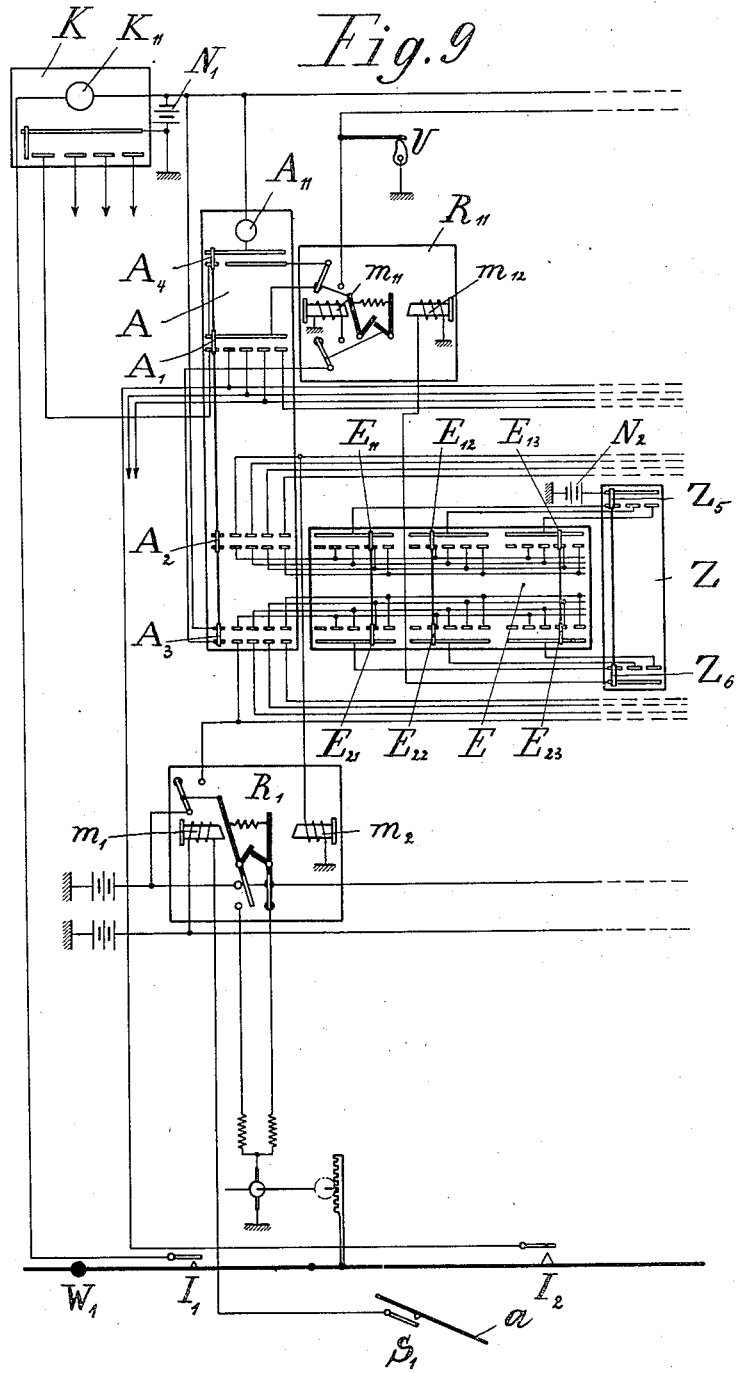

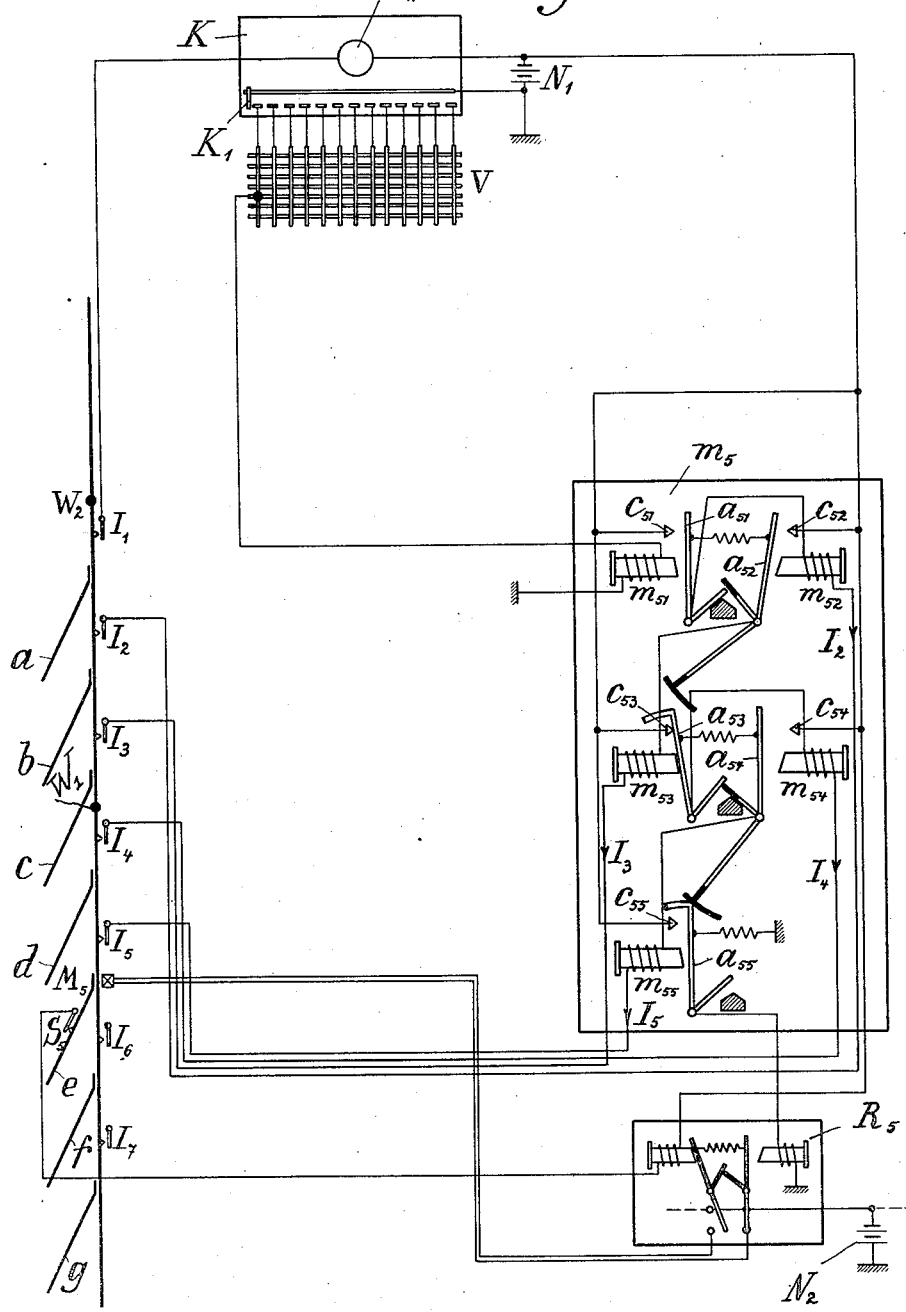

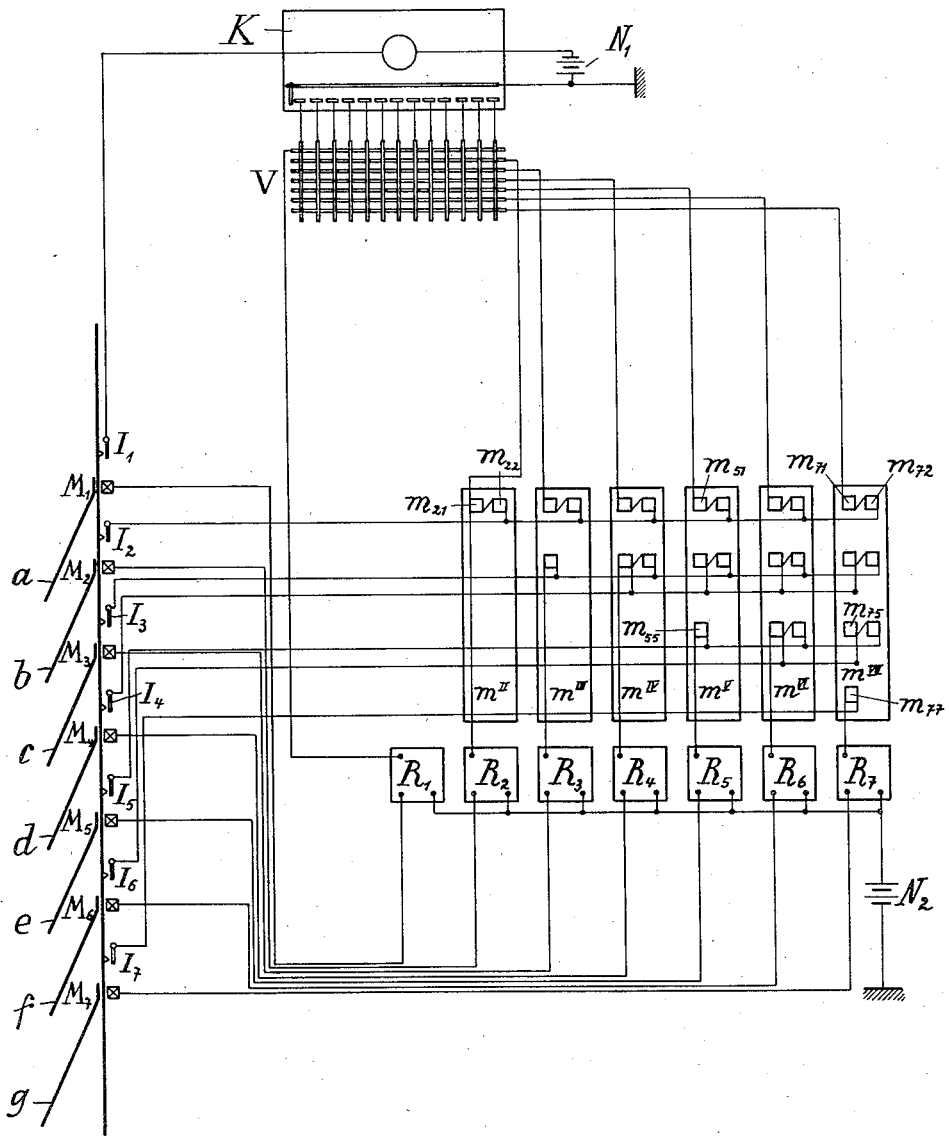

UNITED STATES PATENT OFFICE.

ROBERT PFEIL, OF GRUNEWALD, NEAR BERLIN, GERMANY, ASSIGNOR TO SIEMENS & HALSKE, A. G., OF BERLIN, GERMANY, A CORPORATION OF GERMANY.

SWITCH-YARD FOR GRAVITY SYSTEMS.

1,067,544.      Specification of Letters Patent.      Patented July 15, 1913.

Application filed September 28, 1909. Serial No. 520,000.

*To all whom it may concern:*

Be it known that I, ROBERT PFEIL, a subject of the German Emperor, residing in Grunewald, near Berlin, Germany, have invented certain new and useful Improvements in Switch-Yards for Gravity Systems, of which the following is a full and clear specification, the invention being illustrated in the accompanying drawings and its novel features being more particularly pointed out in the annexed claims.

My invention relates in general to so called gravity systems employed in railroad switch yards in which the cars picked up by the yard locomotive in any sequence are pulled up onto the hump where they are cut loose from the train and roll down the hump by gravity to be shunted into the desired sidings. The shunting of the cars in this manner requires the strictest attention of the towerman. It not only requires an excellent memory but also requires great presence of mind. In large gravity systems in which several cars are shunted at the same time, it is very difficult to watch all cars sufficiently so that the switch points are properly set to guide the car into the siding desired and it is sometimes hard to avoid to shunt a car into the wrong siding or to cause derailment of the car through hasty throwing of the switches.

The particular features of the present invention are means by which the disadvantages above mentioned are avoided and by which the switch points are thrown by means of controlling mechanism, which in turn are controlled by the different cars or groups of cars to be shunted at a time at which the car has approached the points a certain distance. By groups of cars I understand those cars which are meant to be shunted together into one siding. Such groups may comprise one, two or more cars but for shortness I shall define hereinafter such groups simply as a "car."

To clearly define various terms to be used hereinafter it may be stated that the track switches will be called "switch points" or shortly "points," to distinguish same from the electric switches, which will be called shortly "switches." For the mechanism for operating the points such as for instance shown at $M_1$, $M_2$, $M_3$, Figure 1, I shall use the term "point movement," and for the controlling mechanism operated through the movement of the cars the term "distributer," to indicate that this mechanism serves to distribute the current for operating the points.

I have illustrated in the drawings diagrammatically various forms by which my invention may be reduced to practice, which forms, however, though different in their detail arrangement, all embody the principal idea of the invention to cause the car itself to set its points which will shunt it into the desired siding which the operator has selected, when the car is cut loose.

In the drawings: Fig. 1 shows an arrangement in which the point movement motor is directly controlled from the distributer. Fig. 2 shows an arrangement in which the motor is controlled from the distributer indirectly through a relay. Fig. 3 shows an arrangement in which the operation of the distributer is started by the car which it is to control. Fig. 4 shows a modification similar to that shown in Fig. 3, in which several cars on their way to the same siding, are controlled at the same time. Fig. 5 shows how several point movements may be controlled by one distributer. Figs. 6 to 8 show a system in different stages of operation in which several distributers of the character shown in Fig. 5 are arranged. Fig. 9 shows a yard system employing auxiliary selectors between the distributers and the point selectors. Fig. 10 shows a relay operated distributer in detail. Fig. 11 shows a number of distributers as illustrated in Fig. 10 combined into a yard system, and Fig. 12 shows a distributer in which the several electrical connections, made in the previous modification by mechanically operating elements are made by electrically operating elements.

In Fig. 1 a simple gravity system is illustrated which comprises a main track $e$ and the four sidings $a$, $b$, $c$ and $d$ together with their point movements. This figure in particular illustrates a form in which for each siding (except the first siding $a$) individual distributers B, C, D are provided. $M_1$, $M_2$, $M_3$ and $M_4$ represent the point movements well known in the art for the sidings $a$, $b$, $c$ and $d$. For instance point movement $M_1$ comprises electromotor $M_{17}$ with two windings $M_{15}$ and $M_{16}$ for closing and opening the points. This motor transmits its motion to rack bar $M_{19}$ by means of pinion $M_{18}$.

the rack bar being connected with the points of siding $a$. Simultaneously with rack bar $M_{19}$ the coupled switches $M_{11}$ and $M_{14}$ are thrown over. The other point movement $M_2$, $M_3$ and $M_4$ are similarly constructed. The distributers B, C and D comprise each an electromagnetically operated ratchet wheel P and two contact levers which during their rotation slide over a number of contacts. For instance ratchet wheel P of distributer B is operated by means of electromagnet $B_{11}$ and pawl $B_{13}$. On the shaft $P_1$, $P_2$ of wheel P are mounted two switch levers $B_1$ and $B_2$ insulated from each other, which successively slide over contact segments $o$, $a_1$, $b_1$, $c_1$, $d_1$ and $o$, $a_2$, $b_2$, $c_2$, $d_2$ respectively. Contact $b_2$ is connected with winding $M_{25}$ of motor $M_{27}$ for operating the points of siding $b$ so that they are thrown shut when lever $B_2$ by closing the connection $b_2$ $P_2$ closes circuit $N_2$, $M_{27}$, $M_{25}$, $b_2$, $B_2$, $P_2$—ground—$N_2$. In order to close the circuits which control the point movements or to set the circuits in condition to be closed, switches or keys $Z_1$, $Z_2$, $Z_3$, $Z_4$ are provided which respectively belong to sidings $a$, $b$, $c$, $d$. Key $Z_1$ closes the circuit for point movement $M_1$ directly, while keys $Z_2$, $Z_3$, $Z_4$ operate indirectly through distributers B, C, D respectively in connection with rail contacts $I_2$, $I_3$, $I_4$. These rail contacts $I_2$, $I_3$, $I_4$ (which may be of any suitable form known in the art, such as for instance insulated rails or like contact means operated by the car traveling over it) are provided on main track $e$. $I_2$ is connected with the contacts $a_1$, of all distributers B, C, D; $I_3$ with contacts $b_1$ of distributers C, D and $I_4$ with contact $c_1$ of distributer D.

As an example it may be required to shunt the two cars $W_1$ and $W_2$ coming from X into track $e$ and siding $d$ respectively. All points of sidings $a$, $b$, $c$, $d$ being normally open no point operation will be necessary for shunting car $W_1$ into track $e$. However it is necessary to throw the points of siding $d$ shut to shunt car $W_2$. This is accomplished in the following manner: When car $W_2$ leaves point X switch or key $Z_4$ is closed (it is thereby assumed that car $W_1$ has already passed rail contact $I_2$, whereby distributer D is operated preparatory to the point operation. By thus closing $Z_4$ the circuit—ground $Z_4$, $o$, $D_1$, $D_{11}$, $N_1$ ground—is closed, magnet $D_{11}$ is energized and ratchet wheel P of distributer D is fed one tooth by means of pawl $D_{13}$. This operation shifts levers $D_1$, $D_2$, from sector $o$ into contacts $a_1$ and $a_2$ respectively. When now car $W_2$ passes over rail contact $I_2$ it closes circuit—ground $I_2$, $a_1$ (of distributer D) $D_1$, $D_{11}$, $N_1$ ground—and thus the distributer is again fed one tooth farther so that $D_1$ is shifted on to contact $b_1$. When car $W_2$ now passes over contact $I_3$ circuit:—ground $I_3$, $b_1$, $D_1$, $D_{11}$, $N_1$ ground—is closed $D_1$ is shifted onto $c_1$. In passing over contact $I_4$ the car causes a similar operation through which lever $D_1$ is now shifted on to contact $d_1$. Simultaneously with the movement of lever $D_1$, lever $D_2$ is shifted successively from contact $o$ over dead contacts $a_2$, $b_2$, $c_2$ onto contact $d_2$. This closes the following circuit:—ground $D_2$, $d_2$, lever $M_{41}$, motor winding $M_{45}$, armature $M_{47}$, battery $N_2$, ground. Motor $M_{47}$ commences to operate and closes the points of sidings $d$ as described so that the car $W_2$ can run into siding $d$. By thus closing the points motor switches $M_{41}$ and $M_{44}$ are thrown over by means of rack bar $M_{49}$ so that winding $M_{45}$ is cut off and winding $M_{46}$ connected with lever $M_{44}$. Through this operation the motor is automatically cut off and at the same time the circuit controlling the throwing open of the points is set. The points may now be thrown open into their normal position after the car has passed either by hand or automatically, for instance by means of rail contact $S_4$ provided on siding $d$ and to be closed when car $W_2$ passes over it. Thereby circuit:—$S_4$, $M_{44}$, $M_{46}$, $M_{47}$, $N_2$ ground—is closed so that the motor $M_{47}$ is thrown in again but will now revolve in opposite direction and thus return the points to their normal open position. Also the distributer D may now be returned, either by hand or automatically in order to be in proper position to control the shunting of the next car which should enter this siding. The automatic return of the distributer to normal position is also shown in Fig. 1. With switch levers $M_{41}$ and $M_{44}$ is coupled lever $M_{43}$, which is closed as soon as the points of this siding are closed. Thereby circuit:—ground U, $M_{43}$, $d_1$, $D_1$, $D_{11}$, $N_1$ ground—is closed, which circuit is permanently opened and closed by means of the interrupter U permanently operated by motor $U_1$. Thus an electric impulse is imparted to magnet $D_{11}$ and feeds ratchet wheel P one tooth so that levers $D_1$ and $D_2$ again arrive at the dead contacts $o$—$o$. Point movements $M_2$ and $M_3$ similarly have switch contacts $M_{23}$ and $M_{33}$ respectively by which their distributers are returned to normal after the car has passed into the siding in their control.

Instead of controlling the current for the motor of the point movement directly from the distributer it may be also controlled indirectly through a relay interposed between the two elements of the system, whereby the relay is used for controlling the strong currents operating the motor. An arrangement of this character is illustrated in Fig. 2 in which for the sake of simplicity only distributer D, control relay $R_4$ and point movement for siding $d$ are illustrated. As will be seen from this figure relay $R_4$ comprises two magnets $m_2$ for controlling the closing of the points and $m_1$ for controlling the opening of same. Their armatures $r_2$ and $r_1$ pivoted to the magnet yokes at $v_2$ and $v_1$ respectively control the point movement—current through contacts $c_5$ and $c_4$ respectively and they lock each other against the tension of a spring $s$ in such manner that one armature can be pulled from its magnet by this spring only when the other armature is attracted by its magnet. Structures of this character are known in the art so that detail description and illustration thereof is omitted.

The device according to Fig. 2 operates as follows: When a car W assigned to siding $d$ passes in sequence rail contacts $I_2$, $I_3$, $I_4$, contact levers $D_1$ and $D_2$ are shifted step by step until they have reached segments $d_1$ and $d_2$ respectively as described before. This will close the circuit:—ground $N_1$, $P_2$, $D_2$, $d_2$, $m_2$ ground—and thus cause magnet $m_2$ to be energized which latter in attracting its armature $r_2$ will pull armature $r_1$ from its magnet. Thereby contacts $c_4$ and simultaneously the zero return contacts $h_4$ of the distributer are closed. The contact at $c_4$ causes the point motor $M_{47}$ to operate (contact lever $M_{44}$ being then connected with winding $M_{45}$) to throw the points shut so that car W can pass into siding $d$. Simultaneously the return of the distributer to its normal position is caused in similar manner as described before, in this case circuit:—ground $h_4$, $d_1$, $D_1$, $D_{11}$, $N_1$, ground—being closed. The opening of the points takes place when the car has passed rail contact $S_4$ which closes the circuit through magnet $M_1$. This magnet by attracting its armature closes the contact at $c_5$ and contact lever $M_{44}$ being thrown already over to winding $M_{46}$ by the point closing operation the circuit for the reverse operation of the motor is closed in the manner described before, and thus the points are opened. The energizing of magnet $m_1$ has also set the relay back into its normal position in which it is shown in Fig. 2.

In the modification heretofore described the cars delivered by the hump are brought by the towerman by means of selector keys or contacts $Z_1$—$Z_4$ under the control of the distributer of the siding into which they are to be shunted. In order to further relieve the towerman the operation of the distributers may according to the invention be also started automatically by means of a selector controlled by the car. This modification is illustrated in Fig. 3. In order to simplify the diagram the distributers B, C and D are shown with their contacts in a straight line instead of in a circle so the levers $B_1$, $B_2$, $C_1$, $C_2$, $D_1$, $D_2$, instead of rotating as previously shown are assumed here to have movement in a straight line. In reality however they are moving in a circle as previously shown. The detail structure and the operation of the distributers is otherwise the same as shown in Figs. 1 and 2. Accordingly for instance $B_{11}$, $C_{11}$, $D_{11}$ represent the electromagnets of the distributers, $P_1$ and $P_2$ shown here as contact rails correspond with and are in reality the shaft $P_1$ and $P_2$ of Figs. 1 and 2 on which the levers $B_1$, $B_2$, $C_1$, $C_2$, $D_1$, $D_2$ rotate, and contacts $o$, $a_1$, $b_1$, $c_1$, $d_1$ and $o$, $a_2$, $b_2$, $c_2$, $d_2$, are here shown in straight line instead of in a circle. Levers $B_1$, $B_2$ . . . $D_2$ are shown as connected by an insulated rod representing the connection between shafts $P_1$ and $P_2$ of Figs. 1 and 2 and this rod is assumed to shift its contact levers laterally from contact to contact by the action of the electromagnet of the distributer whenever the latter receives an electric impulse as previously described. When the contact pieces have arrived on their contacts $d_1$, $d_2$ they will owing to their arrangement in a circle in reality shift with the next impulse again onto the $o$ contact as described before. Likewise with reference to relays $R_1$ . . . $R_4$ only the electrical elements of same are indicated in detail. The point movements $M_1$ . . . $M_4$ are indicated only by squares. Their structure and coöperation with their relays is the same as shown in Fig. 2. Distributer B with relay $R_2$ and movement $M_2$ controls siding $b$. Distributer C with relay $R_3$ and movement $M_3$ controls siding $c$. Distributer D with relay $R_4$ and movement $M_4$ controls siding $d$. Accordingly also relay magnets $m_2$ are connected with the corresponding contacts of the distributers, that is to say: Magnet $m_2$ of relay $R_2$ with $b_2$ of distributer B, magnet $m_2$ of relay $R_3$ with $c_2$ of distributer C, magnet $m_2$ of relay $R_4$ with $d_2$ of distributer D. The magnets $m_1$ of all relays controlling the reverse operation of the motors as previously described are connected with the rail contacts $S_1$ . . . $S_4$ of the corresponding sidings. For siding $a$ similarly to Fig. 1 no distributer is provided but only a relay $R_1$ and for the main track $e$ no device at all is necessary. Aside from the elements just described the selector K is provided which in its arrangement is in every respect like the distributers just described, that is to say its contacts are shown in a straight line while they are in reality arranged in a circle in the center of which shaft $K_2$ (here shown as a straight rail $K_2$) is disposed and on which contact lever $K_1$ rotates. The shifting of lever $K_1$ from contact to contact is obtained in the same manner as shown and described with reference to the distributers by means of a ratchet wheel (not shown) and by electromagnet $K_{11}$ (shown here diagrammatically as circle). The selector is provided with as many contacts 1, 2, 3, 4, 5, . . . as the train on the hump has cars or groups of cars.

Contact lever $K_1$ operated by magnet $K_{11}$ is located in its normal position between contacts 11 and 1 and connects the different contacts in sequence with the grounded pole of battery $N_1$. The selector magnet $K_{11}$ is connected with one pole to battery $N_1$ and with the other to a rail contact $I_1$ located in front of the first siding. This rail contact must be of such construction that each car assigned to a certain siding in passing over it will cause only one current impulse. A device of this character may for instance comprise an insulated rail as shown in the drawings, the length of which is greater than the longest wheel base of any car passing it. Thus the first car cut loose from the train will move lever $K_1$ through the action of magnet $K_{11}$ from its rest position onto contact 1, the second car will move it onto contact 2, and so on. Each of these contacts is connected with a certain dead contact of distributers B, C, D according to the directing chart of the cars, so that the selector contacts 1, 2, 3, 4 . . . when coöperating with the step by step operated lever $K_1$ will have the same effect on the distributers as the closing of the keys $Z_1$ . . . $Z_4$ by the towerman according to Fig. 1, that is to say they will cause the first impulse and thus the starting of the distributers.

The operation according to Fig. 3 is as follows: The train on the hump may comprise 11 cars or groups of cars which are to be directed as follows:

Into siding $a$ cars $W_3$, $W_9$
Into siding $b$ cars $W_2$, $W_6$, $W_{10}$
Into siding $c$ cars $W_4$, $W_8$
Into siding $d$ cars $W_1$, $W_7$
Into siding $e$ cars $W_5$, $W_{11}$ According to this chart the $o$ contact of lever $B_1$ of the distributer B which controls siding $b$ is connected with contacts 2, 6 and 10 of selector $K_1$; the $o$ contact of lever $C_1$ of C with contacts 4 and 8; the $o$ contact of lever $D_1$ of D with contacts 1 and 7. Contacts 3 and 9 are directly connected with magnet $m_2$ of relay $R_1$ while contacts 5 and 11 remain dead.

Car $W_1$ in passing over insulated rail $I_1$ produces an impulse in selector magnet $K_{11}$ which shifts lever $K_1$ onto contact 1 and thus starts distributer D which is now operated step by step in the same manner as described with reference to Fig. 1 until relay $R_4$ throws the point movement into operation for closing the points for siding $d$. While the car is on its way to the siding and between the points and $I_2$ car $W_2$ runs over $I_1$ and by thus causing lever $K_1$ to move onto contact 2 it starts the operation of distributer B (circuit—ground $N_1$, $B_{11}$, $P_1$, $B_1$, $o$, 2, $K_1$ ground). Upon arrival on $I_2$ car $W_2$ shifts lever $B_1$ from $a_1$ to $b_1$ without disturbing the distributer D owing to the lever $D_1$ of the latter being already moved from the contact connected with $I_2$ through the moving on of car $W_1$. Upon arrival of levers $B_1$, $B_2$ on contacts $b_1$, $b_2$ through closing of contact $I_2$ by car $W_2$ magnet $m_2$ of relay $R_2$ is energized through closing of contact $B_2$, $b_2$ which causes the closing of the points of siding $b$ and thus car $W_2$ is shunted into its proper siding. The third car $W_3$ in passing over $I_1$ shifts selector lever $K_1$ onto contact 3 and causes through energizing of magnet $m_2$ of relay $R_1$ the closing of the points of siding $a$, so that also this car will be properly shunted. The fourth car connects distributer C, the fifth car only shifts selector lever $K_1$ without causing the points of any siding to operate because this car is to be directed into main track $e$. Car $W_6$ starts distributer B, which after car $W_2$ is shunted to the siding $b$ has returned to its normal position by the action previously described, and so on. In order to return all distributers to their normal position each time after they have guided a car to the siding which they control, the same means described with reference to Fig. 1 are employed. All contacts $b_1$, $c_1$, $d_1$ of each distributer which are not employed in the shunting operation are connected with each other and with the zero return contacts $h_2$, $h_3$, $h_4$ of the relays $R_2$, $R_3$, $R_4$ respectively, also previously described, which in turn are connected with a permanently operating interrupter U. Through the impulses produced by this device each distributer is returned into its normal or zero position to be ready for guiding the next car into its siding.

In the above description of the several modifications the fundamental idea of the invention and the principal function of the device has been explained, which is to secure the timely throwing of the points independently of the attention of the towerman. In the following I will now describe certain details important for the practical operation of the system: In the first instance, in order to easily adapt the system shown in Fig. 3 to any directing chart of which the one previously described is only an example, the contacts 1, 2, 3, 4, . . . of selector K may be provided with flexible cords and plugs such as are for instance used on telephone switch boards, in order to connect any number of such contacts with the $o$ contacts of any desired distributer. However in order to avoid the technical disadvantages of connections of that character, the system may be provided with a combination selector V as illustrated in Fig. 4, which consists of two groups of conductive rails disposed one above the other, the rails of one group running at right angles to the rails of the other group. In Fig. 4 the vertical rails are connected with the selector contacts 1, 2, 3, 4, . . .

the horizontal rails with the $o$ contacts of the various distributers. All rails are formed so at the points where they cross the rails of the other group that they can be connected to any rail of the other group at such points for instance by means of plugs as is well known in the art. Moreover another disadvantage of the system shown in Figs. 1 to 3 is that for each siding only one car can be under way at the time because the distributer can control only one car. This disadvantage may be overcome by providing several distributers for each siding. In Fig. 4 such an amplified system is represented in which, however, for simplicity only the distributers for sidings $c$ and $g$ are shown. Each of these sidings has three distributers, A, B, C for siding $c$ and F, G, H for siding $g$. The point movements with their corresponding relays which have already been sufficiently described and illustrated are merely indicated by $M_1 \ldots M_8$. In order to show how broadly a system of such character may be applied the yard represented in Fig. 4 is provided with several groups of sidings so that several points have to be thrown in order to shunt a car into a certain siding. The contacts of distributer levers $A_1$, $B_1$, $C_1$ with equal denomination ($a_1$, $b_1$, $c_1$) are connected together and with rail contacts $I_2$, $I_3$, $I_4$ respectively. Likewise the contacts $a_1$, $b_1$, $c_1$, $d_1$ of like denomination in distributers $F_1$, $G_1$, $H_1$ are correspondingly connected with each other and with rail contacts $I_5$, $I_6$, $I_7$, $I_8$ respectively as shown in the diagram. The distributers of the remaining sidings not illustrated are provided with like connections. For each car directed to any siding of group $a$, $b$, $c$, $d$ point movement $M_1$ of the track $d$ must be operated immediately after the car has passed rail contact $I_1$. For this reason the second contacts $a_1$ of all distributers for the sidings $a$, $b$, $c$, $d$ are connected with point movement $M_1$ (in the figure only the connections for siding $c$ are shown). Moreover the distributers illustrated must cause the operation of point movement $M_4$ controlling siding $c$ as soon as the car passes over contact $I_4$, for which reason the contacts $d_2$ of levers $A_2$, $B_2$, $C_2$ are all connected with point movement $M_4$. Likewise the contacts $a_2$ of all distributers coöperating with the siding group $e$, $f$, $g$, $h$, are connected with point movement $M_5$ and moreover contacts $d_2$, $e_2$ of the distributers of siding $g$ are connected with point movements $M_7$ and $M_8$ in order to start in sequence movements $M_5$, $M_7$ and $M_8$.

In order to permit always the running of three cars assigned for siding $g$ at the same time, for each of these cars one of the three distributers F, G, H must be selected by means of combination selector V. As an example the following distribution chart may be assumed:

Car $W_1$ to siding $c$
Car $W_2$ to siding $g$
Car $W_3$ to siding $b$
Car $W_4$ to siding $d$
Car $W_5$ to siding $c$
Car $W_6$ to siding $b$
Car $W_7$ to siding $g$
Car $W_8$ to siding $c$
Car $W_9$ to siding $b$
Car $W_{10}$ to siding $c$ Accordingly four cars $W_1$, $W_5$, $W_8$, $W_{10}$ are assigned to siding $c$. For car $W_{10}$, the fourth for this siding, again distributer A must be selected which was however already selected to control car $W_1$. This double selection by selector V, however, does not interfere with the operation of the distributers in such instances inasmuch as car $W_1$ has been shunted into its siding long before main selector K starts the operation of the distributer now controlling $W_{10}$. Nevertheless care should be taken that the same distributer is not used in succession for the control of two cars in succession between which not at least two other cars are running. For instance for car $W_{10}$ the distributer controlling car $W_8$ should not be selected, because in this instance the main selector would assign this distributer already to car $W_{10}$ while it is still controlling car $W_8$ and thus it would fail to properly operate. To avoid such occurrences the plugs on selector V may be provided with wings which cover the plug holes of the next two rails, as illustrated. For instance the wing of the plug connecting distributer C to the eighth vertical rail of the selector V covers the two crossings of the rail leading to C with the ninth and tenth vertical rail. Therefore the next or fourth selection for siding $c$ ($W_{10}$) can be made only at a crossing not covered by a wing for instance where the rail connected with it crosses the tenth vertical rail.

In case of less complicated gravity systems the number of distributers may be considerably reduced if instead of the fixed connection between each distributer and certain point movements, point selectors are interposed between the distributer and the point movements by means of which it is possible to operate any of a certain number of point movements desired by means of a certain distributer. These point selectors may form part of the combination selector. A device of this character is illustrated in Fig. 5. In this figure A is the distributer which may be started for instance when a car passes over rail contact $I_1$. Its two levers $A_1$, $A_2$ slide over contacts $o$, $a_1$, $b_1$, $c_1$, $d_1$ and $o$, $a_2$, $b_2$, $c_2$, $d_2$ respectively. The contacts of lever $A_2$ are double contacts one row of which is connected with point movements $M_1$, $M_2$, $M_3$, $M_4$ while the other row is connected with contacts $a_3$, $b_3$, $c_3$, $d_3$ of point selector E which is provided with a hand operated lever $E_1$. By shifting this latter lever onto any desired contact, for instance onto $d_3$, a circuit is set which is closed as soon as distributer lever $A_2$ operated by the movement of the car has been shifted onto contact $d_2$ connected with $d_3$ and which thus sets the point movement for siding $d$ into operation. Since in most instances several cars will be under way at the same time always several distributers of this kind should be provided, at least as many as there are cars or groups of cars presumably running at the same time. Each car controls then its own distributer independently of the other car whereby each distributer will guide its car into the siding to which it is assigned according to the selector.

The arrangement of a system in which several distributers of the character shown in Fig. 5 are employed is shown in Figs. 6 to 8. In describing these figures it may be assumed as an example that four cars can run simultaneously. Accordingly four distributers A, B, C, D with their levers $A_1$, $A_2$, $B_1$, $B_2$, $C_1$, $C_2$, $D_1$, $D_2$ are provided. For each distributer is provided a point selector E, F, G, H respectively with their corresponding levers $E_1$, $F_1$, $G_1$ $H_1$. The general arrangement is similar to that shown in Figs. 4 and 5. The selector K in its structure may be of the same form as that previously described, the only difference being that only as many contacts are necessary as there are distributers, in this instance four. Each of these contacts $k_1$, $k_2$, $k_3$, $k_4$ is in fixed connection with the $o$ contact of one distributer as shown in Fig. 6. The selector lever $K_1$ is in its resting or normal position located between contacts $k_4$ and $k_1$ (the contacts being in reality arranged in a circle as previously explained), and is shifted onto contact $k_1$ through the closing of rail contact $I_1$ by the first car to run, by which magnet $K_{11}$ receives an impulse. The second car shifts lever $K_1$ onto $k_2$, the third onto $k_3$, the fourth onto $k_4$, the fifth shifts again lever $K_1$ from $k_4$ onto $k_1$, the sixth onto $k_2$ and so on in continuous circle.

In the following example it is assumed that six cars $W_1$ ... $W_6$ are to be directed into the following sidings:

$W_1$ to siding $c$
$W_2$ to siding $d$
$W_3$ to siding $a$
$W_4$ to siding $c$
$W_5$ to siding $a$
$W_6$ to siding $b$ In case of the first four cars which are correspondingly assigned to distributers A, B, C, D, and which as was assumed may run simultaneously, the levers $E_1$, $F_1$, $G_1$, $H_1$ may be set before the cars start, (accordingly as shown in Fig. 6 lever $E_1$ is shifted to contact $c_3$, $F_1$ onto $d_3$, $G_1$ onto $a_3$, and $H_1$ onto $c_3$). When now the first car $W_1$ runs over rail contact $I_1$ and lever $K_1$ of the selector K is thereby shifted from its rest position to contact $k_1$ circuit:—ground $K_1$, $k_1$ $A_1$, $A_{11}$, $N_1$ ground—is closed and magnet $A_{11}$ shifts levers $A_1$, $A_2$ of the distributer A from $o$ to contacts $a_1$ and $a_2$ respectively. In like manner the second car $W_2$ shifts lever $K_1$ of the selector to $k_2$ and thus causes the shifting of levers $B_1$ and $B_2$ of distributer B to $a_1$ and $a_2$, the third car $W_3$ shifts $K_1$ to $k_3$ and in distributer C levers $C_1$ and $C_2$ to $a_1$ and $a_2$ respectively and so on. In the meantime car $W_1$ runs over rail contacts $I_2$ and $I_3$ and thus operates its distributer A step by step in the manner described in detail in Fig. 1 so that its lever $A_1$ passes in sequence over contacts $b_1$, $c_1$ and so on. Distributer B is in no way affected by car $W_1$ because this car has in each instance already left the rail contacts $I_2$ and $I_3$ before lever $B_1$ of distributer B has reached the contacts connected with these rail contacts. The operation of distributer B can thus be caused only by car $W_2$.

Fig. 7 shows the condition of the system when the third car $W_3$ has started and run over rail contact $I_1$. $W_1$ has then run over contact $I_3$, the levers $A_1$, $A_2$ of its distributer are on contacts $c_1$, $c_2$, point movement $M_3$ receives current because then the circuit:— ground $N_2$, $E_1$, $c_3$, $c_2$ $M_3$ ground—is closed so that the points of siding $c$ are closed. These points are shown as closed in Fig. 7. At that time car $W_2$ is still between $I_2$ and $I_3$, $W_3$ between $I_1$ and $I_2$ as also shown. The levers $B_1$, $B_2$ of distributer B are on contacts $b_1$, $b_2$, levers $C_1$, $C_2$ of C on contacts $a_1$, $a_2$. Thus also point movement $M_1$ receives current because circuit:—ground $N_2$, $G_1$, $a_3$, $a_2$, $M_1$ ground—is closed (accordingly the points controlled by $M_1$ are shown closed). Thus cars $W_1$ and $W_3$ run into the sidings $c$ and $a$ respectively to which they are assigned, while car $W_2$ continues to run on the main track $f$.

In Fig. 8 the cars $W_1$ and $W_3$ are shown on their destination. $W_2$, is now running between rail contacts $I_3$ and $I_4$ and $W_4$ between $I_1$ and $I_2$. Levers $A_1$ and $C_1$ of distributers A and C have been returned to their normal position in the manner previously described and are free ready to control another car. Thus lever $E_1$ of point selector E belonging to distributer A may now already be set onto contact $a_3$ in order to control the shunting of car $W_5$ into siding $a$ according to the directing chart. The further shunting of the cars takes place in similar manner. When for instance car $W_5$ has passed rail contact $I_1$ and levers $A_1$ and $A_2$ of A are shifted to contacts $a_1$ and $a_2$, car $W_2$ has then arrived in front of the movement $M_4$ of siding $d$ and movements $M_1$ and $M_4$ close their points so that car $W_5$ will run into siding $a$ and $W_2$ into siding $d$. This relieves distributer B and its point selector F may now be set for siding $b$ in order to control the car $W_6$ through this distributer on its way to this siding. In case still more than six cars should be directed the next distributer available therefor would be C with its point selector G and D with its point selector H, after their cars which they heretofore controlled have reached their destination.

This whole apparatus is extremely simple to operate, the towerman should merely take care that he does not set a point selector anew, the distributer of which still controls a car, and thus still operates. However according to the invention also in this respect mistakes by the operator may be prevented by having the point selectors locked in their position unless their distributer is in its rest position. The automatic return of the points and of the distributers to their normal position may be accomplished in the manner already described with reference to Figs. 1 to 3.

The whole operation of the yard system may be considerably simplified if for each car or group of cars discharged from the hump an individual distributer and point selector is provided. In this case all selectors may be set right in the beginning before the cars start carefully according to the directing chart and without haste. Thus the distribution of cars is automatic throughout.

In order to save distributers, several distributers may be combined into one and only the number of point selectors may be equal to the number of cars. For this purpose auxiliary selectors of similar character as such shown in Figs. 6 to 8 may be employed according to my invention, which may be switched by the magnets of the distributers from one point selector to the other. A system employing auxiliary selectors of such character is shown in Fig. 9. As in Figs. 6 to 8 it may be assumed that four cars may run simultaneously. Therefore four distributers A, B, C, D are provided of which however only A is shown completely in connection with its selectors and relays. After one whole cycle of operation of its levers $A_1$, $A_2$, $A_3$, $A_4$, the distributer feeds the contact levers $Z_5$ and $Z_6$ of auxiliary selector Z one contact. The contacts coöperating with $Z_5$ are connected to the levers $E_{11}$, $E_{12}$, $E_{13}$ and those coöperating with $Z_6$ are connected to the levers $E_{21}$, $E_{22}$, $E_{23}$ of the point selector. Thus the auxiliary selector establishes in the proper sequence the connections with the proper selector levers. The levers $E_{11}$ and $E_{21}$; $E_{12}$ and $E_{22}$; $E_{13}$ and $E_{23}$ respectively are mechanically coupled, and the contacts of the main selector K are as also shown in Fig. 5 connected with the $o$ contacts of the levers $A_1$, $B_1$, $C_1$, $D_1$ (only the connection of $A_1$ is shown in Fig. 9). Therefore as soon as the first car $W_1$ runs over rail contact $I_1$ it starts and controls distributer A, the second car $W_2$ controls B, $W_3$ controls C, $W_4$ controls D, $W_5$ again controls A, and so on (only $W_1$ and A are shown here). So long as car $W_1$ is under way lever $E_{11}$ of the point selector is connected with battery $N_2$ by way of lever $Z_5$, while $E_{21}$ is connected by way of $Z_6$ with the magnet $m_{12}$ of relay $R_{11}$. This circuit cannot be interfered with by cars $W_2$, $W_3$, and $W_4$ which may be under way at the same time because these cars are assigned to the three other distributers B, C and D. Thus the distributer A operates in the same manner as described with reference to Fig. 3, until car $W_1$ has reached the siding selected by the selector levers $E_{11}$ and $E_{21}$. Thereupon distributer A returns automatically into the rest position and thereby shifts levers $Z_5$ and $Z_6$ of auxiliary selector Z one contact farther. By this shifting distributer A and its devices are set in proper condition to control the shunting of car $W_5$ for instance into siding $a$. In a similar manner the distributers B, C and D are operated independently from each other.

The devices heretofore described and shown which control the shunting of the cars to the sidings to which they are assigned are provided with mechanically operating feeding or switching devices, in which through each current impulse produced by a car by closing a rail contact, a ratchet wheel (P in Fig. 1) is fed one tooth. According to the invention these devices may also be replaced by devices which consist of a series of electromagnets which cause in similar manner the closing or setting of circuits controlling the closing and opening of the points as was previously described and illustrated by the ratchet wheels. A distributer of this character is shown in Fig. 10 in detail while Fig. 11 shows the general arrangement of a number of distributers and relays of this character. As an example car $W_1$ may be assigned to siding $e$ the points of which are operated by movement $M_5$ which in turn is controlled by distributer $m_5$. The general arrangement of the sidings, the main selector K and the combination selector V may be similar to that shown in the previously described figures. Distributer $m_5$ is provided with five electromagnets $m_{51}$, $m_{52}$ ... $m_{55}$ with their respective armatures $a_{51}$, $a_{52}$ ... $a_{55}$ and their contacts $c_{51}$ ... $c_{55}$. These armatures may assume three positions, they are either entirely attracted or entirely pulled off or they may be in the middle position. This latter position shall be called hereinafter the normal or rest position for all of these armatures except the first armature $a_{51}$ which has no middle position. When car $W_1$ runs over rail contact $I_1$ lever $K_1$ of selector K is shifted in known manner from its rest position onto the first contact. Thereby magnet $m_{51}$ is energized, which in turn attracts its armature $a_{51}$ and thus closes contact $c_{51}$. Armature $a_{52}$ is thereby pulled into its extreme off position and thus locks armature $a_{51}$ in its attracted position owing to the shape of the armatures, the action of which has been previously explained with reference to armature $r_1$, $r_2$ of Fig. 2. By closing contact $c_{51}$ circuit:—ground $I_2$, $m_{52}$, $a_{51}$, $c_{51}$, $N_1$ ground—is set which circuit however is only closed when car $W_1$ runs over rail contact $I_2$. When this happens magnet $m_{52}$ is energized and its armature $a_{52}$ attracted which in turn closes contact $c_{52}$ and also releases and pulls off armature $a_{51}$. By closing contact $c_{52}$ circuit:—ground $I_3$, $m_{53}$, $a_{52}$, $c_{52}$, $N_1$ ground—is set so that it is in condition to take up the control of a second car $W_2$. Fig. 10 shows the condition before the arrival of car $W_1$ on rail contact $I_4$. Armature $a_{53}$ of magnet $m_{53}$ is locked in attracted position by armature $a_{54}$ which is in its extreme off position and thereby magnet $m_{54}$ is connected with $N_1$ over $a_{53}$ and $c_{53}$. When at last car $W_1$ runs over $I_5$ the last magnet $m_{55}$ of distributer $m_5$ closes circuit:—ground $N_1$, $c_{55}$, $a_{55}$, $R_5$ ground—and relay $R_5$ now causes point movement $M_5$ to operate. For opening the points controlled by $M_5$ the rail contact $S_5$ is provided which is connected with relay $R_5$ in the known manner previously described with reference to relay $R_4$ of Fig. 2.

A plan of the general arrangement of all distributers, relays, rail contacts and point movements of the character shown in Fig. 10 is shown in Fig. 11. For each point movement $M_1$, $M_2$ ... $M_7$, a relay $R_1$, $R_2$ ... $R_7$ is provided respectively, and moreover for each siding, except siding $a$, one distributer $m_{II}$, $m_{III}$ ... $m_{VII}$ is provided. The distributer for cars running into the first siding $a$ may be omitted because relay $R_1$ may be directly connected from the combination selector V. Distributer $m_{II}$ of siding $b$ is provided with two magnets, $m_{III}$ for siding $c$ with three magnets and so on, which are all of the character shown in Fig. 10 at $m_{51}$ ... $m_{55}$.

A similar modification of such a system of distributers in which magnets of the character shown in Figs. 10 and 11 control the several points is shown in Fig. 12. The distributer shown in this figure is devised for the same purpose as that shown in Fig. 10, which is to control the shunting of car $W_1$ into siding $e$. However while the mechanism of the distributer shown in Fig. 10 is operated through the combination and co-operation of mechanically and electrically operating elements formed by the mutually locking armatures and the contacts, the modification in Fig. 12 represents a purely electrical connection of the electromagnets controlling the contacts. In this case for instance distributer $m_5$ controlling point movement $M_5$ of siding $e$ is provided with five magnets $m_{51}$ ... $m_{55}$ with the armature of which the switches $m_{511}$, $m_{512}$, $m_{521}$ ... $m_{552}$ are connected respectively. In their normal or resting position the armatures are in the off position as shown in the figure. When now as described before the car runs over the first rail contact $I_1$, lever $K_1$ of the main selector K is shifted to the first contact whereby circuit:—$N_1$, $m_{51}$, V, $K_1$, $N_1$—is closed. Magnet $m_{51}$ attracts its armature and thereby closes switches $m_{511}$ and $m_{512}$. This operation sets the circuit:—ground $I_2$, $m_{511}$, $m_{52}$, $N_1$ ground—which circuit is closed when the car runs over rail contact $I_2$. Simultaneously with the attracting of the armature of magnet $m_{51}$ the circuit:—ground $N_1$, $m_{51}$, $m_{512}$, $m_{523}$ ground—magnet $m_{51}$ is rendered independent of selector K but is through contact $m_{523}$ rendered dependent upon the condition of the next magnet $m_{52}$. In similar manner the circuits of the other magnets $m_{53}$, $m_{54}$ and $m_{55}$ are set one by one to be closed one by one by the car running over contacts $I_3$, $I_4$, $I_5$. Each magnet by attracting its armature interrupts the energizing circuit of the previous magnet which causes the armature of the latter to fall off and return into its normal position. As soon as the last magnet $m_{55}$ closes its switch a current passes through one of the magnets of relay $R_5$ and movement $M_5$ operates its points as described before. After the car has passed into its siding the points may be opened through the car passing over rail contact $S_5$, in siding $e$ which energizes the second magnet of relay $R_5$ as has been also previously described in detail.

Magnet $m_{55}$ may be omitted by having one pole of one of the relay magnets not connected with $m_{552}$ but with $m_{541}$ and its other pole with the pole of the battery $N_1$ not connected with the ground.

In case the yard system contains several main tracks as for instance shown in Fig. 4, the apparatus shown in Fig. 12 may be easily fitted to control the shunting of any car into any siding by providing on the distributer magnets, located in their connection before the sidings, another switch which, similarly to the action of switch $m_{552}$ in Fig. 12, causes the setting of the points by means of a relay.

The distributers shown in Figs. 10 and 12 have the advantage over those which are mechanically operated that elements such as ratchet teeth and pawls subject to wear are omitted and further that they require less space.

Since the armatures of the distributers return immediately after their operation one by one into their normal position, the same distributer may be used for simultaneously controlling the shunting of several cars.

It is of course feasible to construct also the main selector K similarly to the distributer by providing a chain of electromagnets energizing each other in sequence, to obtain the step by step movement of the contact lever.

Hereinbefore I have described the whole yard system as operated with electrically driven point movements, but it is obvious that they may be replaced by any other power suitable for this operation without departing from the spirit of my invention. The relays controlling the operation of the point movements as described may for instance also control valves of fluid pressure operated switch points. The relays controlling the point movements may also be omitted entirely by providing a sufficient number of distributers so that each has to work only once or also by having the distributers returned gradually to their normal position by rail contacts in the sidings operated by the cars. During this operation the distributer may at the same time cause the re-opening of the points directly. Moreover this system may also be employed in case of hand operated points. In this case the distributer instead of operating or controlling a point movement controls the release of the hand lever and a signal connected therewith. Further each car axle may influence the operation of the magnet of the main selector. In this case the selector and the distributers should have correspondingly more contacts, and the rail contact $I_1$ must be shorter than the smallest wheel base.

In the modifications shown and described the number of rail contacts $I_1$, $I_2$ . . . has been chosen equal to the number of sidings. However from the diagrams shown it is obvious that the number and also the location of these contacts may be changed as required. For instance if the distance between two consecutive sidings is so great that several cars or groups of cars may be simultaneously between the points of these sidings, a greater number of rail contacts should be provided between these points. If on the other hand the points of two sidings are too close together it may be advisable or necessary to place the rail contact of the second siding before the points of the first siding.

The relays controlling the point movements are shown in the drawings only diagrammatically. It is of course obvious that their electrical and mechanical connections should be such that the return movement of the points to normal takes place only after the car has run completely into its siding.

While I have also shown and described the yard system as electrically operated it may be also operated purely mechanically. For instance instead of the electrical rail contacts a device may be provided at the rails which is mechanically operated by the cars and which mechanically transmits the motion through cables or rods to a distributer which in turn mechanically coöperate so with the system that this distributer eventually controls mechanically the setting of the points.

The electrically controlled devices shown and described merely represent an example to show how the idea embodied in the invention may be reduced to practice.

I claim:

1. A switch yard for gravity systems having sidings, means for closing the points of said sidings, and means for controlling said closing means, said controlling means adapted to be operated step by step by the car during its progress toward the siding to be closed, and means remote from the car for selecting the controlling means to be operated by the car.

2. A switch yard for gravity systems having sidings, means for closing the points of said sidings and means for controlling said closing means, actuating means distributed in suitable number along the rails between the starting point of the car and the siding to be closed and operated successively by the car on its way to said siding, for actuating said controlling means to cause the closing of the points of the desired siding.

3. A switch yard for gravity systems having sidings and a plurality of means for automatically controlling the shunting of each car into any desired siding, said means adapted to be operated step by step by the car during its progress toward its siding, means on the rails operated by the shunted car for controlling the operation of said automatic means and means remote from the car for assigning one of said automatic means to the car desired.

4. A switch yard for gravity systems having sidings and means for automatically controlling the shunting of each car into any desired siding, said means adapted to be operated step by step by the car during its progress toward its siding and rail contacts located in suitable number in front of the siding which receives the car and adapted to be successively operated by the latter for controlling the operation of said automatic means.

5. A switch yard for gravity systems having sidings and a plurality of means adapted to automatically control the shunting of any desired car into any desired siding, said means adapted to be operated step by step by the car during its progress toward its siding and rail contacts located in front of the siding which receives the car and operated by the latter for controlling the operation of said automatic means and means remote from the car for assigning one of said automatic means to the car desired.

6. A switch yard for gravity systems, having a plurality of sidings, a separate point operating means for each siding, control means for establishing an operative condition in the point operating means, and circuits for actuating the control means having terminals corresponding with respective siding points and closed successively by the car in its progress from one siding point to another; of selecting means for assigning and limiting the successive operations of the control means to a desired point operating means.

7. A switch yard for gravity systems having sidings and a distributer for each car to be shunted into any of said sidings, for automatically controlling the movement of the switch points of the siding required, said distributer adapted to be operated step by step by the car during its progress toward its siding, rail contacts operated by the car during the shunting, which control the movement of said distributer to shunt the car, means for assigning one of said distributers to the car desired and a rail contact also operated by said car at the start, causing the assigning means to assign the car to the distributer and siding desired.

8. A switch yard for gravity systems having sidings and a distributer for each car to be shunted into any of said sidings for automatically controlling the movement of the switch points of the siding required, said distributer adapted to be operated step by step by the car during its progress toward its siding, rail contacts operated by the car during the shunting which control the movement of said distributer to shunt the car, and means operated by the car when it has passed into its siding for returning its distributer and the switch of said siding to its normal position.

9. A switch yard for gravity systems having sidings adapted to receive the cars and distributers each adapted to control the shunting of one car at a time and to be controlled in this operation by the movement of the controlled car during its progress toward the siding, and means for assigning a car to a distributer, each of said sidings which is to receive the car having one of said distributers which causes the shunting of the car assigned to it into the siding.

10. A switch yard for gravity systems having sidings adapted to receive the cars and distributers each adapted to control the shunting of one car at a time and to be controlled in this operation by the movement of the controlled car during its progress toward the siding and a selector suitably operated for assigning a car to a distributer, each of said sidings which is to receive a car having one of said distributers, which causes the shunting of the car assigned to it into said siding.

11. A switch yard for gravity systems having sidings adapted to receive the cars and distributers each adapted to control the shunting of one car at a time and to be controlled in this operation by the movement of the controlled car during its progress toward the siding, and a selector operated by the movement of the car before entering the yard for assigning said car to a distributer, each of said sidings which is to receive the car having one of said distributers which causes the shunting of the car assigned to it into the siding, and means for suitably connecting said selector with said distributers.

12. A switch yard for gravity systems having sidings adapted to receive the cars and distributers each adapted to control the shunting of one car at a time and to be controlled in this operation by the movement of the controlled car during its progress toward the siding, and a selector operated by the movement of the car before entering the yard for assigning said car to a distributer, each of said sidings which is to receive the car having one of said distributers which causes the shunting of the car assigned to it into the siding, means for suitably connecting said selector with said distributers, and a rail contact in each siding operated by the car after it has passed into the siding for returning its distributer and the siding switch into their normal positions.

13. A switch yard for gravity systems having sidings adapted to receive the cars and distributers each adapted to control the shunting of one car at a time and to be controlled in this operation by the movement of the controlled car during its progress toward the siding, and a selector operated by the movement of the car before entering the yard for assigning said car to a distributer, each of said sidings which is to receive the car having one of said distributers which causes the shunting of the car assigned to it into the siding, and means for connecting said selector with said distributers to cause the desired distributer to shunt the car into the desired siding.

14. A switch yard for gravity systems having sidings and point movements for said sidings, distributers each adapted to control the shunting of one car at a time into any siding by controlling its point movement and adapted to be controlled by the movement of the car during its progress toward its siding, and point selectors for said distributers for connecting a distributer with the point movement of any desired siding.

15. A switch yard for gravity systems having sidings adapted to receive the cars and point movements for said sidings, distributers each adapted to control the shunting of one car at a time into any siding by controlling its point movement and adapted to be controlled by the movement of the car during its progress toward its siding, a selector for assigning a distributer to a car and point selectors for said distributers, each selector connected to all point movements for connecting a distributer with the point movement of any desired siding.

16. A switch yard for gravity systems having sidings adapted to receive the cars and point movements for said sidings, distributers each adapted to control the shunting of one car at a time into any siding by controlling its point movement and adapted to be controlled in its operations step by step by the movement of the car during its progress toward its siding, a selector for assigning a distributer to a car, and a plurality of point selectors for each distributer, each point selector connected to all point movements and adapted to connect said distributer with the point movement of any desired siding and an auxiliary selector for each distributer having contacts, each contact connected with one of said point selectors and connection between said distributer and said auxiliary selector to permit said distributer, after it has performed one full cycle of operations in shunting a car, to close the subsequent contact of said auxiliary selector to bring the subsequent point selector in operative connection with said distributer for connecting the latter with any desired point movement for shunting another car.

17. A switch yard for gravity systems having sidings adapted to receive the cars, a switch point movement for each siding and distributers for automatically controlling the shunting of each car into any desired siding during the progress of the car toward its siding, each distributer having two sets of contacts arranged in a circle and a lever for each set adapted to successively pass step by step over said contacts, a relay for conjointly operating said two levers step by step, rail contacts operated by the shunted car for successively closing suitable circuits for operating said relay step by step at predetermined times and a connection between the switch point motor and some of said contacts to cause the operation of said motor when said contacts are closed by said levers, means operated by the point movement for stopping the motor after the points are closed and setting it for operation in reverse direction and a rail contact connected with the motor and operated by the car after entering the siding for starting the motor in the reverse direction to open the points and means for further energizing said relay at intervals to return said contact levers step by step to their zero position after the car has entered the siding, substantially as shown.

18. A switch yard for gravity systems having sidings adapted to receive the cars, a switch point movement for each siding and distributers for automatically controlling the shunting of each car into any desired siding during the progress of the cars toward its siding, each distributer having two sets of contacts arranged in a circle and a lever in each set adapted to successively pass step by step over said contacts, a relay for conjointly operating said two levers step by step, rail contacts operated by the shunted car for successively closing suitable circuits for operating said relay step by step at predetermined times and a relay connection between the switch point motor and some of said contacts to indirectly cause the operation of said moter when the contacts are closed by said levers, means operated by the point movement for stopping the motor after the points are closed and setting it for operation in reverse direction and a rail contact connected with the motor and operated by the car for starting the motor in the reverse direction to open the points and means for further energizing said lever operating relay at intervals to return said contact levers step by step to their zero position after the car has entered the siding, substantially as shown.

ROBERT PFEIL.

Witnesses:
WOLDEMAR HAUPT,
HENRY HASPER.